United States Patent Office.

CHARLES J. EAMES, OF NEW YORK, N. Y.

Letters Patent No. 102,788, dated May 10, 1870.

IMPROVED MEDICAL COMPOUND.

The Schedule referred to in these Letters Patent and making part of the same.

*To all whom it may concern:*

Be it known that I, CHARLES J. EAMES, of New York, in the county of New York, in the State of New York, have invented a new and improved Medical Compound; and I do hereby declare that the following is a full and exact description thereof.

The object of my invention is to obtain the well known properties of carbolic and cresylic acids in a more effective form than has hitherto been used, and more especially to convey these acids to the parts affected.

I have found that when these acids are mixed with substances that readily dissolve, such as sugar and saline powders, their effects are not so permanent, and, moreover, require a larger quantity to produce the desired results. I have found that gums and resins are the best and most effective substances to compound with these acids, being slowly soluble when taken into the mouth.

I am aware that these acids have been used in combination with sugar and starch, in the form of candies; with these substances the acids are not in a condition to effect the desired object.

I have found, from frequent observation, that when the lower region of the thorax is inflamed, it becomes difficult to convey the remedies to the part affected, but with my compound, the combined acids and gums readily adhere to the sides of the throat, and are retained a sufficient length of time to entirely allay the inflammation.

My invention consists in combining carbolic and cresylic acids, or either of them, with gum-arabic, gum-tragacanth, and resins, or any analogous substances, in such quantities as are required, having in view the specific case to be treated.

As an example, I use, for all ordinary cases, one pound of gum-arabic, dissolved in water, and then boiled or evaporated until it becomes the consistency of sirup. I then add one ounce of gum-tragacanth, six ounces of grape or cane sugar, and one drachm of carbolic and cresylic acids. The whole is then boiled for about fifteen minutes; it is then poured into molds and allowed to dry, at a temperature of about 150° Fahrenheit; it is then ready for use.

I do not limit myself to the above proportions or combined ingredients, but sometimes prefer to use the acids with gum-arabic alone, and in such proportions as are required to obtain the desired object, and at others, combined with rosins, &c., for specific purposes.

What I claim, and desire to secure by Letters Patent, is—

The medical compound, substantially as herein set forth, formed by the combination of carbolic acid with gums, as set forth.

CHARLES J. EAMES.

Witnesses:
J. FRANKLIN REIGART,
EDM. F. BROWN.